(12) United States Patent
DeVincent

(10) Patent No.: US 10,395,214 B2
(45) Date of Patent: Aug. 27, 2019

(54) METHOD FOR AUTOMATICALLY CREATING A CUSTOMIZED LIFE STORY FOR ANOTHER

(76) Inventor: Marc DeVincent, Dublin, OH (US)

( * ) Notice: Subject to any disclaimer, the term of this patent is extended or adjusted under 35 U.S.C. 154(b) by 1276 days.

(21) Appl. No.: 12/780,762

(22) Filed: May 14, 2010

(65) Prior Publication Data

US 2010/0293037 A1  Nov. 18, 2010

Related U.S. Application Data

(60) Provisional application No. 61/178,822, filed on May 15, 2009.

(51) Int. Cl.
*G09B 5/06* (2006.01)
*G09B 7/00* (2006.01)
*G06F 17/40* (2006.01)
*G06Q 10/10* (2012.01)

(52) U.S. Cl.
CPC ............ *G06Q 10/10* (2013.01); *G06F 17/40* (2013.01); *G06Q 10/101* (2013.01); *G09B 7/00* (2013.01)

(58) Field of Classification Search
USPC ...... 705/0.001, 1.1, 300, 321; 715/209, 733, 715/716, 708; 709/232; 434/322, 362; 725/13; 455/466; 403/386
See application file for complete search history.

(56) References Cited

U.S. PATENT DOCUMENTS

| | | | |
|---|---|---|---|
| 5,729,741 A | 3/1998 | Liaguno et al. | |
| 6,340,978 B1 * | 1/2002 | Mindrum | G06Q 10/10 715/733 |
| 7,287,225 B2 * | 10/2007 | Mindrum | G06Q 10/10 715/716 |
| 7,831,912 B2 * | 11/2010 | King | H04N 1/00244 715/708 |
| 8,103,947 B2 | 1/2012 | Lunt et al. | |
| 2002/0136601 A1 * | 9/2002 | Schlutius | B42D 3/12 403/386 |
| 2005/0102867 A1 * | 5/2005 | Youngdahl | B42D 15/022 40/124.11 |
| 2007/0005795 A1 * | 1/2007 | Gonzalez | G11B 27/10 709/232 |
| 2007/0072165 A1 * | 3/2007 | Dittrich | G09B 5/06 434/362 |
| 2007/0088601 A1 * | 4/2007 | Money | G06Q 10/1053 705/321 |

(Continued)

FOREIGN PATENT DOCUMENTS

WO   WO 03071775 A2 *  8/2003

*Primary Examiner* — Lynda Jasmin
*Assistant Examiner* — Kimberly L Evans
(74) *Attorney, Agent, or Firm* — Bodi Law LLC

(57) ABSTRACT

A method of creating a customized life story comprising using specific pre-determined questions based upon intended purpose and customer demographic to prepare a manuscript and a video derivative product, manually or automatically by utilizing computer programs, applications, or software to automatically organize the recorded information into pre-determined end product formats. The end products are based on an interview and items from a subject. Additional information from other members of the family can be added to the end products without the subject's knowledge. Digital audio and video files stored on a storage device are often included with the manuscript.

15 Claims, 2 Drawing Sheets

(56) References Cited

U.S. PATENT DOCUMENTS

| | | | |
|---|---|---|---|
| 2007/0166684 A1* | 7/2007 | Walker | G09B 7/00 434/322 |
| 2007/0261071 A1* | 11/2007 | Lunt | G06Q 10/10 725/13 |
| 2008/0162309 A1* | 7/2008 | Tardif | G06Q 10/10 705/30 |
| 2009/0247195 A1* | 10/2009 | Palmer | G06Q 30/02 455/466 |
| 2009/0254802 A1* | 10/2009 | Campagna | G06F 17/217 715/209 |
| 2010/0293037 A1* | 11/2010 | DeVincent | G06Q 10/10 705/300 |

* cited by examiner

METHOD FOR AUTOMATICALLY CREATING A CUSTOMIZED LIFE STORY FOR ANOTHER

CROSS-REFERENCES TO RELATED APPLICATIONS

The present application is a continuation of and claims priority to provisional patent application No. 61/178,822 filed May 15, 2009 titled Method For Creating a Customized Life Story For Another, which is hereby incorporated by reference in its entirety.

FIELD OF THE INVENTION

The present invention relates generally to customized writings for others, and specifically to creating a customized life story for another.

BACKGROUND OF THE INVENTION

It is a problem in society when relatives pass on without providing stories of their lives to the next generation. Archiving family history is important, and can require an excessive amount of time and energy searching for information after those that witnessed the history are no longer here. Through the study of our relatives lives we can discover things about our own lives to fulfill dreams and promises.

Genealogy reports the genetic make-up of a person, but the stories that each generation create as part of life typically are not part of a genealogy publication. The difficulty with capturing family stories is that the amount of information available may be overwhelming and the information is never transcribed for preservation.

There is a long-standing need for a method that enables a subject, family member or friend to create and publish a written life story about the subject. Some solutions exist for a person to take on the task of writing his or her autobiography, but few people actually take the time required to write their life story. There is a need for an method that is simple, unobtrusive, and undemanding, but that is fast and comprehensive as to gathering the person's stories and details.

An ideal system would extract relevant stories, pictures and other data from the subject to create a customized life story without that person doing a great deal of the work. Currently, no methods exist for efficiently and accurately creating a life story of another. As a result, much of the great stories of parents and grandparents are forgotten.

The present invention addressed the above-described problems by providing a fast, efficient, accurate, and automatic method of extracting information and producing a life story without requiring the subject to expend an excessive amount of time and energy.

BRIEF DESCRIPTION OF THE INVENTION

The present invention is a method of creating a customized life story comprising the steps of a) contacting the subject to conduct a preliminary interview; b) conducting the interview, said interview comprising electronically recorded questions and answers, obtaining photographs and video of a subject, digitalization of existing photographs and other objects, electronically recorded descriptions of the photographs and other objects; selection of the dust jacket, dust jacket photo and book title; c) transcribing the interview (manually or automatically); d) preparing a manuscript from the recordings, photographs, video and digitalized existing photographs and other objects, manually, or by utilizing computer programs, applications, or software to automatically organize the acquired life story information into pre-established formats, which would allow for possible eventual publication and/or printing (including, but not limited to e-book formats, etc.) along with a corresponding video product that is automatically generated by utilizing computer programs, applications, or software to produce a video derivative of the final result, printing a draft of the manuscript for review by the subject; f) possibly adding information from other members of the family to the manuscript without the subject's knowledge; g) printing a final manuscript and video end product, said final manuscript having an area to secure a digital storage device; h) downloading audio and video of the subject to the digital storage device; i) adding the loaded digital storage device to the area of the manuscript; j) delivering the customized life story to the subject; and k) preparing and delivering a follow up note with a survey and coupon to the subject.

As used herein, "approximately" means within plus or minus 25% of the term it qualifies. The term "about" means between ½ and 2 times the term it qualifies.

The compositions and methods of the present invention can comprise, consist of, or consist essentially of the essential elements and limitations of the invention described herein, as well as any additional or optional ingredients, components, or limitations described herein or otherwise useful in compositions and methods of the general type as described herein.

All references to singular characteristics or limitations of the present invention shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

DETAILED DESCRIPTION OF THE INVENTION

Figure 1:
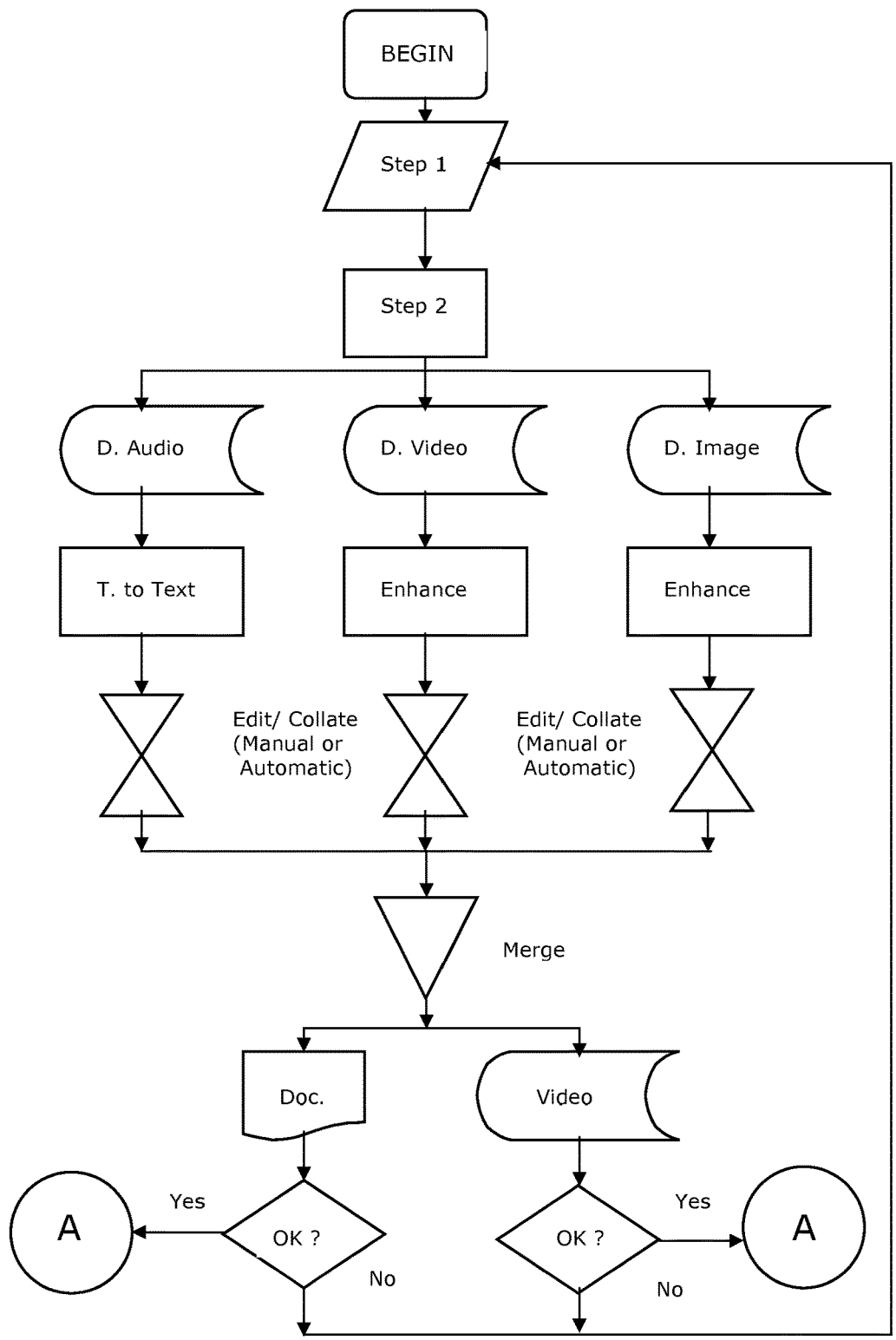
FIG. 1 is flow chart of an embodiment of the invention.
Figure 2:
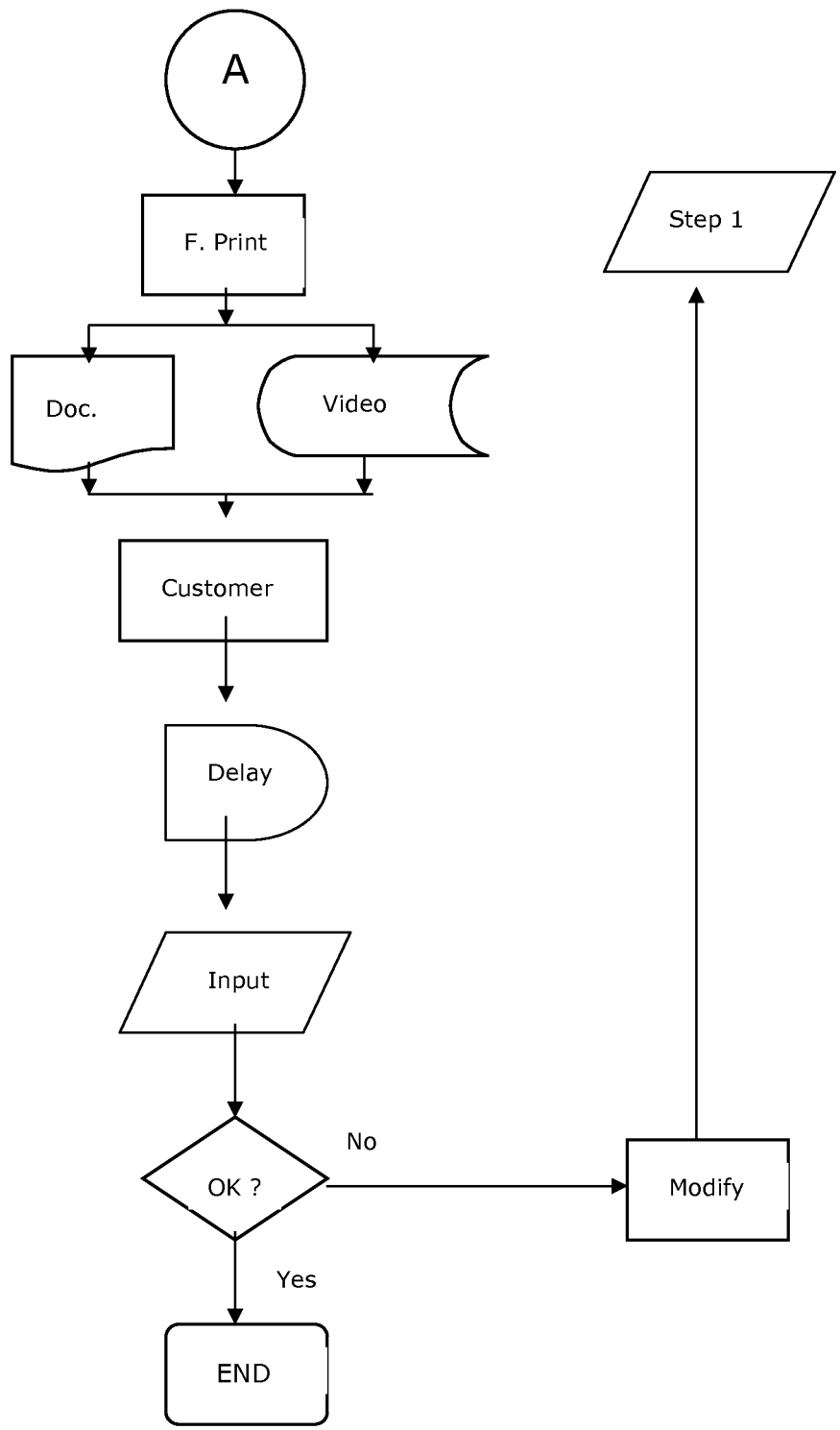
FIG. 2 is a continuation flow chart of an embodiment of the invention.

As shown in the Figures, the present invention comprises a method of creating a customized life story. The first step is to contact the subject before a scheduled interview, and conduct a preliminary interview. This is done via phone, email, fax and the like. The subject is contacted about three days prior to the interview. The purpose of the initial contact is to conduct a preliminary interview, and describe the scope and general content of the primary interview. The preparer will discuss the time involved, what will take place, when, that photographs will be taken of the subject, and the like. The preparer asks the subject to consider several key areas of content for story (think about+remember).

The interview step comprises a full day, broken up into 2-3.5 hours segments, or several partial days, separated for breaks for the preparer and the subject. Interview start times are typically 8:30-9:00 AM and end time are typically 5:00-5:30 PM. The preparer(s) travel to the subject's location on the day of the interview and prepare the subject and the setting. A quiet comfortable well lit, location is preferred. A recording device is used to capture the subject's voice as well as to record the content for transcription. Typically, two recorders are used to insure capture in case of technical difficulties. A digital video recording of the subject is also made during the interview.

A list of specific pre-determined questions customized for the subject (and based upon intended purpose and customer demographic) are recited by the preparer(s). After the subject responds, the preparer may follow up with additional questions to obtain more information. The subject provides additional photographs and other objects that may be referenced in the customized life story. The subject may further provide other materials, such as letters, diaries, personal artwork, illustrations, and the like for inclusion on the life story. The photographs and other materials may be scanned while the subject is recorded speaking about the subject matter of each. The description from the subject is captured on the digital audio recording and video recording devices.

The bound customized life story is covered with a dust jacket. The subject picks a dust jacket photo and title and provides any illustrations that may be included on the cover. The jacket may be enclosed in a transparent material.

After the interview, the preparer transcribes the interview. The transcription can be manual (by interviewer), by another person (outsourced), or by means of digital voice software recognition systems. The transcription is edited, arranged into chronological or other order, and separated into sections/chapters. Scanned and taken photographs and other items are selected for inclusion in sections/chapters. The scanned and taken photographs and other items may be enhanced or otherwise modifies prior to inclusion in the manuscript. This entire process can be automated by utilizing computer programs, applications, or software to automatically organize the recorded information (all sources: audio, video, and other acquired information) into a predetermined format (including, but not limited to e-book format, etc.), which is selectable by the person conducting the interview. A corresponding video based derivative can also be prepared automatically in this same manner.

After the edited manuscript and video based product is prepared, the customized life story is set up for final printing. A draft copy is provided to the subject (or a customer) for review for a designated period of time. The draft is edited in line with any changes and comments and the edited draft is printed.

The printer sets the edited draft for printing and adjustments from the preparer are made. A final draft of the text based and video based product is provided to the subject (or a customer) for a final review.

Prior to final printing, other members of the family are queried as to additional content for the customized life story. A final section may be added (without the subject's knowledge) that contains the additional content. The completed draft is sent for printing. Any number of copies may be printed.

The preparer downloads audio, video, and all other acquired information from the subject to a storage device, such as a high-density compact disk, an optical disk, a tape, a thumb drive, a CD-ROM drive, and the like.

The printed customized life story (text based and video based products) are checked for defects and returned to correct any errors. The final printed version may have an area in the book that secures the storage device containing the downloaded audio and video files of the subject, as well as the video based derivative. The final product is delivered to the subject or the customer.

A follow up note with a survey is sent to the customer with a coupon for a referral. Completed surveys are analyzed to determine improvements to the process, and features are implemented to improve the product.

The foregoing description of the invention has been presented for purposes of illustration and description. It is not intended to be exhaustive nor to limit the invention to the precise form disclosed. Many alternatives, modifications, and variations will be apparent to those skilled in the art. For instance, the present invention could be readily implemented for any entity, including businesses, or any other person or thing for which a life story may be created. Likewise, the invention is not limited to a traditional paper book. For example, the customized life story may be presented on the digital media equivalent of a conventional printed book, such as those available on personal computers, smart phones, and hardware devices, including (but not limited to) e-books. Accordingly, this invention is intended to embrace all alternatives, modifications, and variations that fall within the spirit and broad scope of the claims.

What is claimed is:

1. A method of manufacturing a book encompassing a customized life story comprising the steps of:
   presenting to a subject specific pre-determined interview questions;
   electronically recording, on a recording device, oral responses of the subject to said specific interview questions;
   a computer converting said electronically recorded oral responses of the subject into a transcription;
   the computer capturing one or more physical items into one or more electronic images;
   automatically organizing, using a computer, said transcription and said electronic images into a draft manuscript;
   providing the draft manuscript to the subject for review by the subject;
   receiving editorial changes to said draft manuscript from the subject for use in creating a final manuscript;
   choosing one of said electronic images for use on a cover or dust jacket; and
   printing at least one physical copy of the final manuscript as a physical book.

2. The method of claim 1, further comprising the steps of:
   storing said electronically recorded responses and said electronic images including the voice of the subject in a portable storage device; and
   delivering said portable storage device to the subject.

3. The method of claim 2, wherein said book delivered to said subject is adapted to have a portion for receiving said portable storage device secured in the book.

4. The method of claim 1, further comprising the step of, prior to creating said final manuscript, providing a version of the manuscript edited by the subject to a person other than the subject for review and editing by the person for creating said final manuscript.

5. The method of claim 1, further comprising the steps of:
   creating a dust jacket having an image of a photograph chosen by the subject printed thereon; and
   providing said book with said dust jacket cover.

6. The method of claim 1, wherein said computing device is said computer.

7. A method of manufacturing a book encompassing a customized life story comprising the steps of:
   presenting to a subject specific pre-determined interview questions;

conducting the interview by electronically recording, on a recording device, oral responses of the subject to said specific interview questions;
a computer converting said electronically recorded oral responses of the subject into a transcription;
the computer capturing one or more physical items into one or more electronic images;
automatically organizing, using a computer, said transcription and said electronic images into a draft manuscript in chapter format;
providing the draft manuscript to the subject for review and editing by the subject;
receiving editorial changes to said draft manuscript from the subject for use in creating a final draft manuscript;
providing the final draft manuscript to a person other than the subject for review and editing by the person;
receiving editorial changes to said draft manuscript from the person for use in creating a final manuscript;
recording at least a portion of the electronically recorded responses including the voice of the subject and at least a portion of the electronic images on a digital storage device;
printing at least one physical copy of the final manuscript as a physical book, wherein
the digital storage device is physically secured within the book prior to delivery.

8. The method of claim 7, further comprising the steps of:
creating a dust jacket or cover having an image of a photograph chosen by the subject printed thereon; and
providing said book with said dust jacket or cover.

9. A method of manufacturing a book encompassing a customized life story comprising the steps of:
conducting a preliminary interview with a subject to determine the scope of a project to capture the customized life story of an individual;
presenting to the subject specific pre-determined interview questions customized for the subject based on results of the preliminary interview;
conducting an interview by electronically recording on a recording device oral responses of the subject to said specific interview questions;
subsequent to receiving the responses of the subject, providing the subject with additional questions for obtaining additional oral responses from the subject;
a computer converting said electronically recorded oral responses and additional responses of the subject into a transcription;
the computer capturing one or more physical items into one or more electronic images;
automatically organizing, using a computer, said transcription and said electronic images into a draft manuscript in chapter format;
providing the draft manuscript to the subject for review and editing by the subject;
receiving editorial changes to said draft manuscript from the subject for use in creating a final draft manuscript;
obtaining additional content related to the life story from a person other than the subject for inclusion in the manuscript;
storing said electronically recorded responses including the voice of the subject and said electronic images in a portable storage device;
choosing one of said electronic images for use on a cover or dust jacket;
transforming one or more copies of the final manuscript into a physical book organized in chapter format, wherein said book includes the cover or dust jacket with said chosen electronic image provided thereon, and wherein
the digital storage device is physically secured within the book; and
delivering a copy of said book with said portable storage device secured therein to the subject.

10. The method of claim 9, further comprising the steps of:
creating a dust jacket cover having an image of a photograph chosen by the subject printed thereon; and
providing said book with said dust jacket cover installed thereon.

11. A method of manufacturing a book encompassing a customized life story comprising the steps of:
presenting to a subject specific pre-determined interview questions;
conducting an interview by electronically recording on a recording device oral responses of the subject to said specific interview questions;
a computer converting said electronically recorded oral responses of the subject into a transcription;
the computer capturing one or more physical items into one or more electronic images using a computing device;
automatically organizing, using a computer, said transcription and said electronic images into a draft manuscript in chapter format;
providing the draft manuscript to the subject for review and editing by the subject;
receiving editorial changes to said draft manuscript from the subject for use in creating a final draft manuscript;
providing the final draft manuscript to a person other than the subject for review by the person;
receiving editorial changes to said draft manuscript from the person for use in creating a final manuscript;
storing at least a portion of said electronically recorded responses including the voice of the subject and at least a portion of said electronic images in a portable storage device;
transforming one or more copies of the final manuscript into a physical book having a portion adapted for securely receiving said portable storage device within said book;
creating a dust jacket or cover having an image of a photograph chosen by the subject printed thereon; and
delivering a copy of said book covered by said dust jacket or cover with said portable storage device provided in said secure portion to the subject.

12. A method of manufacturing a book encompassing a customized life story comprising the steps of:
presenting to a subject specific pre-determined interview questions;
electronically recording, on a recording device, oral responses of the subject to said specific interview questions;
subsequent to receiving the responses of the subject, providing the subject with additional questions for obtaining further oral responses related to the responses to the predetermined interview questions received from the subject;
a computer converting said electronically recorded oral responses and further oral responses of the subject into a transcription;
the computer capturing one or more physical items into one or more electronic images;

automatically organizing, using a computer, said transcription and said electronic images into a draft manuscript in chapter format;

providing the draft manuscript to the subject for review by the subject;

receiving editorial changes to said draft manuscript from the subject for use in creating a final manuscript;

choosing one of said electronic images for use on a cover or dust jacket; and printing at least one physical copy of the final manuscript as a physical book, wherein said book includes the cover or dust jacket with said chosen electronic image provided thereon.

13. The method of claim 12, further comprising the steps of:

storing said electronically recorded responses and said electronic images in a portable storage device; and delivering said portable storage device to the subject.

14. The method of claim 13, wherein said book delivered to said subject is adapted to have a portion for receiving said portable storage device secured in the book.

15. The method of claim 12, further comprising the step of obtaining additional content related to the life story from a person other than the subject for inclusion in the manuscript.

\* \* \* \* \*